(12) United States Patent
Kang

(10) Patent No.: US 9,069,883 B2
(45) Date of Patent: Jun. 30, 2015

(54) DOCUMENT MANAGEMENT METHOD AND DOCUMENT MANAGEMENT APPARATUS USING THE SAME

(75) Inventor: Hyung-jong Kang, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 862 days.

(21) Appl. No.: 12/048,649

(22) Filed: Mar. 14, 2008

(65) Prior Publication Data

US 2008/0228734 A1    Sep. 18, 2008

(30) Foreign Application Priority Data

Mar. 17, 2007  (KR) .................. 10-2007-0026371
Oct. 19, 2007   (KR) .................. 10-2007-0105786

(51) Int. Cl.
    *G06F 17/30* (2006.01)
(52) U.S. Cl.
    CPC .............................. *G06F 17/30997* (2013.01)

(58) Field of Classification Search
    CPC .................. G06F 17/30707; G06F 17/30705; G06F 17/30235
    See application file for complete search history.

(56) References Cited

U.S. PATENT DOCUMENTS

| | | | | |
|---|---|---|---|---|
| 5,642,288 A | * | 6/1997 | Leung et al. | 700/223 |
| 2002/0059288 A1 | * | 5/2002 | Yagi et al. | 707/102 |
| 2004/0059740 A1 | * | 3/2004 | Hanakawa et al. | 707/100 |
| 2004/0193672 A1 | * | 9/2004 | Samji et al. | 709/200 |
| 2005/0278741 A1 | * | 12/2005 | Robarts et al. | 725/46 |
| 2006/0020588 A1 | | 1/2006 | Liu et al. | |
| 2006/0023585 A1 | * | 2/2006 | Takahashi | 369/47.1 |
| 2006/0036568 A1 | * | 2/2006 | Moore et al. | 707/1 |
| 2007/0021145 A1 | * | 1/2007 | Lam | 455/556.1 |
| 2007/0055940 A1 | * | 3/2007 | Moore et al. | 715/738 |

FOREIGN PATENT DOCUMENTS

JP    2005-234731    9/2005

\* cited by examiner

*Primary Examiner* — Anh Tai Tran
(74) *Attorney, Agent, or Firm* — Staas & Halsey LLP

(57) ABSTRACT

A document management method includes generating a category list based on identification information of a document; and assigning at least one category in the category list to the document.

16 Claims, 10 Drawing Sheets

DOCUMENT MANAGEMENT METHOD AND DOCUMENT MANAGEMENT APPARATUS USING THE SAME

CROSS-REFERENCE TO RELATED APPLICATIONS

This application claims the benefit of Korean Application Nos. 2007-26371, filed Mar. 17, 2007, and 2007-105786, filed Oct. 19, 2007 in the Korean Intellectual Property Office, the disclosures of which are incorporated herein by reference.

BACKGROUND OF THE INVENTION

1. Field of the Invention

Apparatuses and methods consistent with aspects of the present invention relate to a document management method and a document management apparatus using the same, and more particularly, to a document management method which searches a document according to a category, and a document management apparatus using the same.

2. Description of the Related Art

With the widespread proliferation of computers, various documents which had once been handwritten are now being written using application programs, such as Microsoft Word. The documents written with these application programs are stored as files in a computer or other storage medium, such as an optical disk, a hard drive, etc. In addition to written documents, images, such as photographs, drawings, etc., are also stored as files to be managed by using computers.

Since computers include application programs which are used to generate different types of documents for various purposes, for example, presentations, emails, photo galleries, etc., most documents today are generated with a computer. Thus, a computer may routinely manage at least several hundred to several thousand documents.

An operating system which is installed in the computer provides a Web browser, such as Windows Explorer, to manage a number of document files. The Web browser, such as Windows Explorer, generates and removes folders, manages document files in folders, and searches for document files if a user does not know where a desired file is stored.

Since the Web browser, such as Windows Explorer, generally determines the content of document files based on file names, a document management program which has a preview function and a simple manipulation function has been developed. The preview function is provided to preview the content of the files, while the simple manipulation function is provided to manipulate the document files.

A conventional document management program provides a category search function to search categories of the document files to thereby search for a desired file among a plurality of files. Additionally, the conventional document management program further provides functions to preview and manipulate the content of the files included in the searched category.

To use the category search function, a user selects a desired document file and a desired category from a preset category list to thereby assign the desired category to the desired document file. When a user would like to search a document file, he or she selects a category from a category search menu to display the document file or files having the assigned category.

However, category names in the category list are fixed in the conventional document management program. Generally, examples of the fixed category names in the conventional document management program include such names as "business," "gift," "holiday," "idea," "personal," "international," etc., which are irrelevant to folder names used by the computer system or folder names unique to a user. Since the conventional document management program cannot easily identify categories, a user may have difficulty finding a desired file by searching the fixed category names. Also, searching the fixed category names for a document file takes quite some time.

Furthermore, in the situation where a user wants to assign a category to each document file, it takes a long time to assign categories to each of the document files stored in the computer.

SUMMARY OF THE INVENTION

Accordingly, it is an aspect of the present invention to provide a document management method which generates a category list including categories based on the name of a directory corresponding to a location of a document and sets categories such that the categories are easily identifiable, and a document management apparatus using the same.

Also, it is another aspect of the present invention to provide a document management method which excludes a less relevant category from set categories and assigns a category to a document file efficiently, and a document management apparatus using the same.

Further, it is another aspect of the present invention to provide a document management method which assigns a particular category to a document having a search keyword to search for a desired document without difficulty, and a document management apparatus using the same.

According to an aspect of the present invention, a document management method includes generating a category list based on identification information of a document, and assigning at least one category in the category list to the document.

According to an aspect, the generating of the category list based on the identification information includes generating the category list based on at least one of a directory name of the document and a keyword of the document.

According to an aspect, the directory name includes a plurality of sub-directory names corresponding to a plurality of categories generated in the category list, and the method further includes removing at least one of the sub-directory names from the category list generated based on the directory name.

According to an aspect, the assigning of the at least one category includes assigning a preset category to the document having the keyword.

According to an aspect, the document management method further includes assigning a preset category selected from among a preset category list to the document according to a user selection.

According to an aspect, the preset category selected from among the preset category list is editable.

According to an aspect, the document management method further includes displaying the generated category list on a screen.

According to an aspect, the document management method further includes searching for the document by searching for the at least one assigned category.

According to another aspect of the present invention, a document management apparatus includes a storage unit which stores a document therein; a category generating unit which generates a category list based on identification information of the document; and a controller which assigns at least one category in the category list to the document.

According to an aspect, the identification information includes at least one of a directory name of the document and a keyword of the document.

According to an aspect, the directory name includes a plurality of sub-directory names corresponding to a plurality of categories generated in the category list, and the controller controls the category generating unit to exclude at least one of the sub-directory names from the plurality of categories generated based on the directory name.

According to an aspect, the controller assigns a preset category to the document having the keyword.

According to an aspect, the controller assigns a preset category selected from a preset category list to the document according to a user selection.

According to an aspect, the controller enables a user to edit the preset category selected from the preset category list.

According to an aspect, the controller displays the generated category list on a screen.

According to an aspect, the controller searches for the document by searching for the at least one assigned category.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
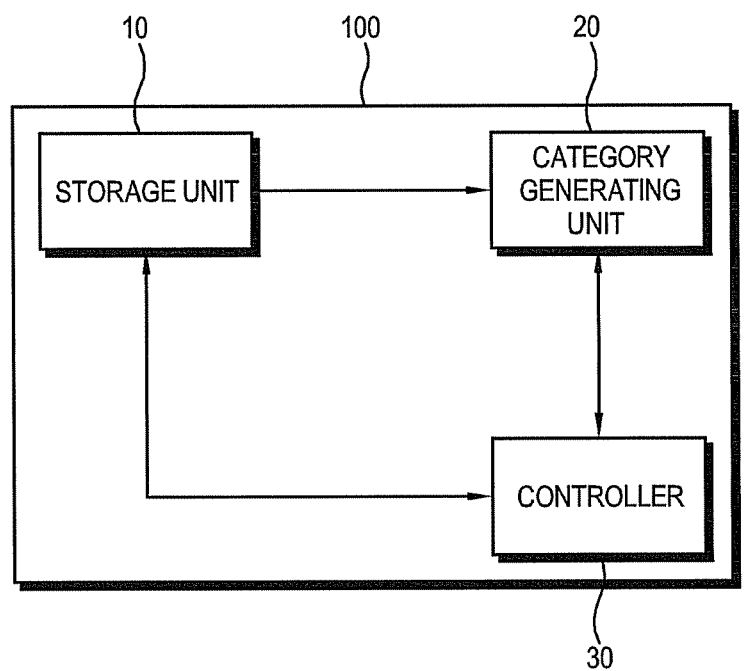
FIG. 1 is a block diagram of a document management apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a document management apparatus 100 according to an embodiment of the present invention. As shown therein, the document management apparatus 100 includes a storage unit 10, a category generating unit 20 and a controller 30. The document management apparatus 100 according to aspects of the present invention may be implemented in various types of computing devices, such as, for example, a personal computer (PC), a personal digital assistant (PDA), a digital camera, a cell phone, etc., as long as the document management apparatus 100 is capable of classifying a document according to a directory name and storing the document.

The storage unit 10 stores a document therein. According to an aspect of the present invention, the storage unit 10 may include at least one of a non-volatile memory such as a flash memory, a large capacity storage medium such as a hard disk, or a combination thereof. It is understood, however, that the storage unit 10 is not limited to these examples, and may be many other types of storage units known in the art. The storage unit 10 stores a document in a location corresponding to the directory name.

The category generating unit 20 generates a category list based on identification information of a document. According to an aspect of the present invention, the identification information of the document includes at least one of each sub-directory name of the document, the sub-directory names indicating a location in which the document is stored, and a keyword of the document. It is understood that the identification information may be a sub-directory name, a group of sub-directory names, a keyword, a group of keywords, or a combination of at least one sub-directory name and at least one keyword, and may further be various other types of identification information.

The controller 30 assigns at least one category included in the category list to the document. After assigning the category to the document, the controller 30 searches for the document according to the assigned category when the user performs a search operation. The controller 30 according to aspects of the present invention may include a software program. The controller 30 controls the category generating unit 20 to generate the category list, assigns categories to document files, searches categories when the user performs a search operation, and displays document files based on the search results.

Figure 2:
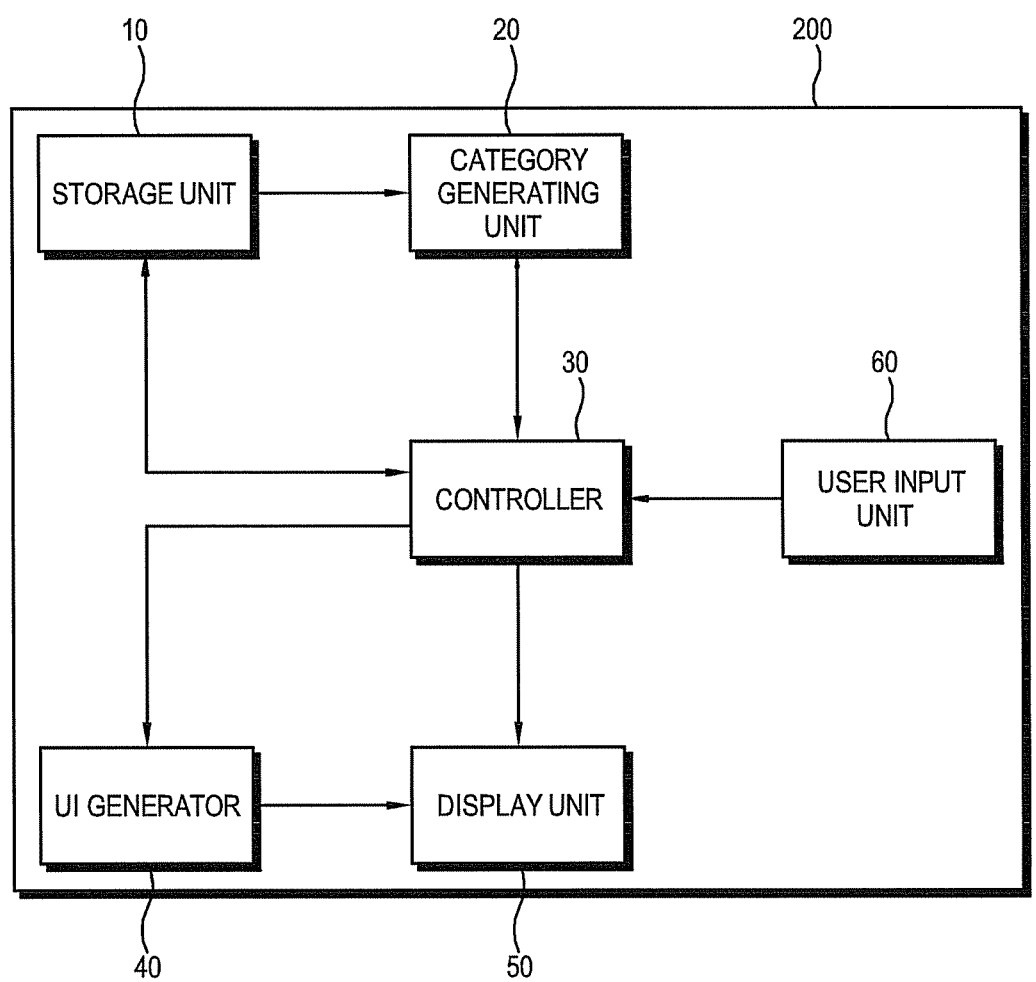
FIG. 2 is a block diagram of a document management apparatus according to another embodiment of the present invention.

Hereinafter, a document management apparatus 200 according to another embodiment of the present invention will be described with reference to FIG. 2. The document management apparatus 200 includes the storage unit 10, category generating unit 20, and controller 30 described above with reference to FIG. 1, and further includes a UI (user interface) generator 40, a display unit 50 and a user input unit 60.

The UI generator 40 generates a UI 300 (FIG. 3) to display an index information display region 300a to display index information of a document file stored in the storage unit 10, a data search region 300b, a category adding region 300c, and document display regions 300d and 300e. The UI 300 which is generated by the UI generator 40 is described later.

The display unit 50 displays the UI 300 generated by the UI generator 40, a directory name corresponding to a location in the storage unit 10 to store the document, and a searched document or documents, i.e., a document or plurality of documents found by the searching operation. The user input unit 60 receives input from a user to assign categories to documents and receives commands to search for documents. According to an aspect of the present invention, the user input unit 60 may be a keyboard, a mouse, a touch screen, a combination thereof, or any other input devices commonly employed with computing devices.

Figure 3:
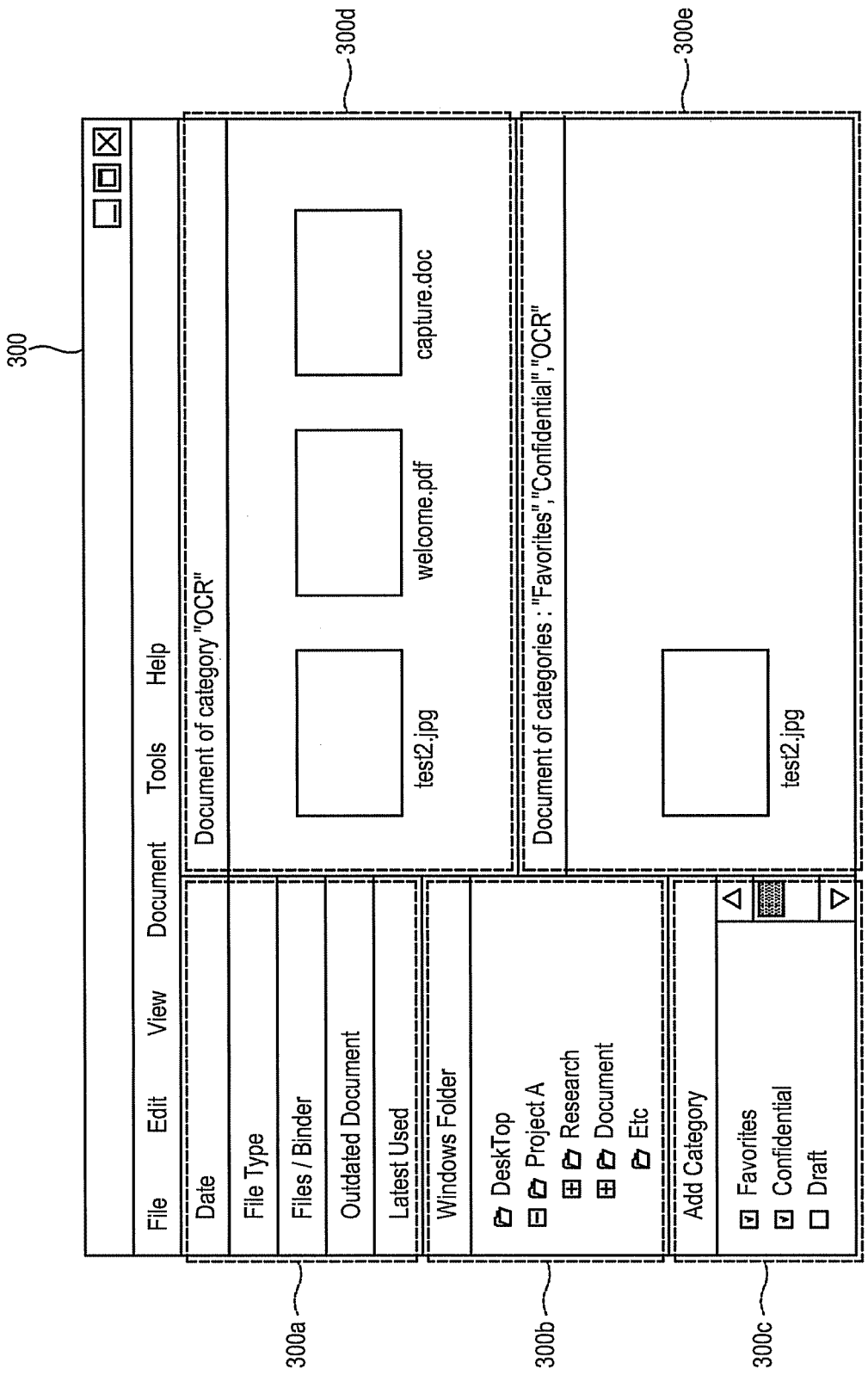
FIG. 3 illustrates a user interface generated by the document management apparatus according to aspects of the present invention, which is used to search for a document.

Hereinafter, the user interface (UI) 300 which is generated by the UI generator 40 will be described with reference to FIG. 3. As shown in FIG. 3, index information is displayed in the index information display region 300a, and includes various types of index information, such as date information indicating when a document was created, and file type information indicated a file type, such as .doc, .pdf, .tiff, etc. It is understood the index information may include various other types of indexing information as well, such as the name of the author who created the document, the size of the document, etc.

The data search region 300b performs a similar function to a data search function performed by Windows Explorer. The data search region 300b displays stored data in a "tree," which is a term well known in the art and refers to an organizational structure in which data is stored in directories and sub-directories. A user may select, copy and move data from the data search region 300b to other regions in the UI 300.

The category adding region 300c displays the category list generated by the category generating unit 20. A user may add, i.e., assign, categories to a document with the category adding region 300c. The category adding region 300c is provided as an additional interface of an application program, and is displayed on a front screen of the application program. Thus, a user may assign a category to a document without difficulty.

The document display regions 300d and 300e display a document or documents which are searched for by the controller 30 according to a category. The document display regions 300d and 300e display the searched document or documents, i.e., the document or documents found through the searching, as a thumb nail or by using a preview mode. If a plurality of categories is used to search for the documents, the documents found by the searching are classified according to a category.

For example, if a user selects "OCR" (optical character recognition) from the category list to search for a document assigned with the "OCR" category, such as, for example, a handwritten document scanned into a system via a scanner, the controller 30 searches for documents assigned with the "OCR" category among the documents stored in the storage unit 10 and displays the documents found by the searching in the document display region 300d. Then, if a user selects each of "Favorites," "Confidential," and "OCR" categories to search for a document assigned with each of these categories, the controller 30 searches for documents assigned with the "Favorites," "Confidential" and "OCR" categories among the documents stored in the storage unit 10 and displays the documents found by the searching in the document display region 300e, represented by the document "test2.jpg" shown in FIG. 3.

Figure 4:
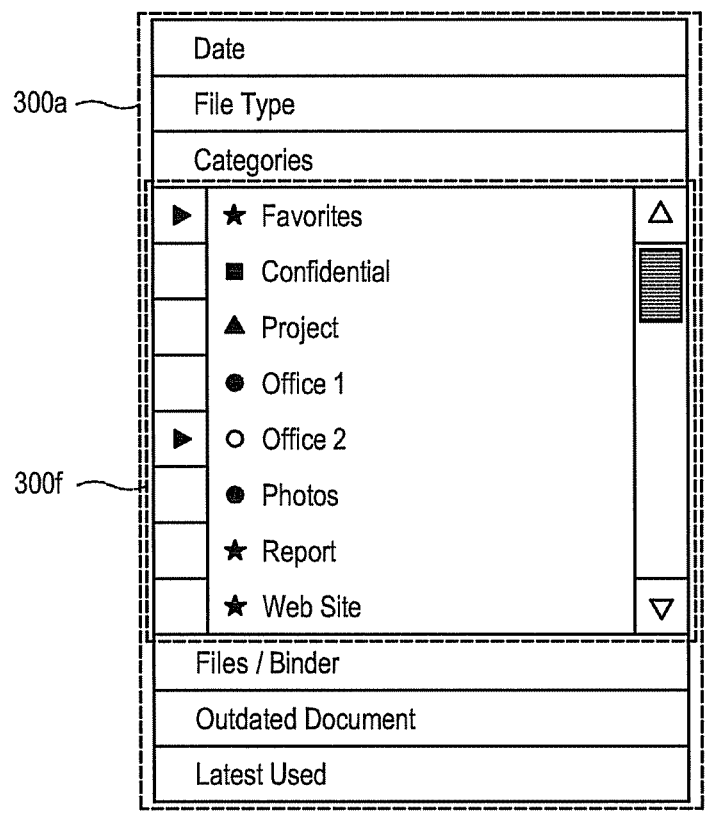
FIG. 4 illustrates an example of a category search region that is displayed when a category menu is selected from the document management apparatus according to aspects of the present invention.

Although FIG. 3 illustrates an example of a UI 300 having two document display regions 300d and 300e, the number and size of document display regions may be adjusted according to various factors, such as, for example, by the number of user searches, and a scroll bar may be added to the document display regions. FIG. 4 illustrates an example of a category search region 300f which is displayed when the category menu is selected from the document management screen. As shown in FIG. 4, many different categories may be displayed on the category search region 300f, such as, for example, "Favorites," "Confidential," "Project," "Office 1," "Office 2", "Photos," "Report," "Web Site," etc. Also, the various categories upon which the search is based may be selected, for example, by clicking on an icon to the left of the displayed categories, as shown by the example in FIG. 4 where "Favorites" and "Office 2" are selected. It is understood that the category search region 300f may be configured in a variety of formats other than the format shown in FIG. 4.

Figure 5:
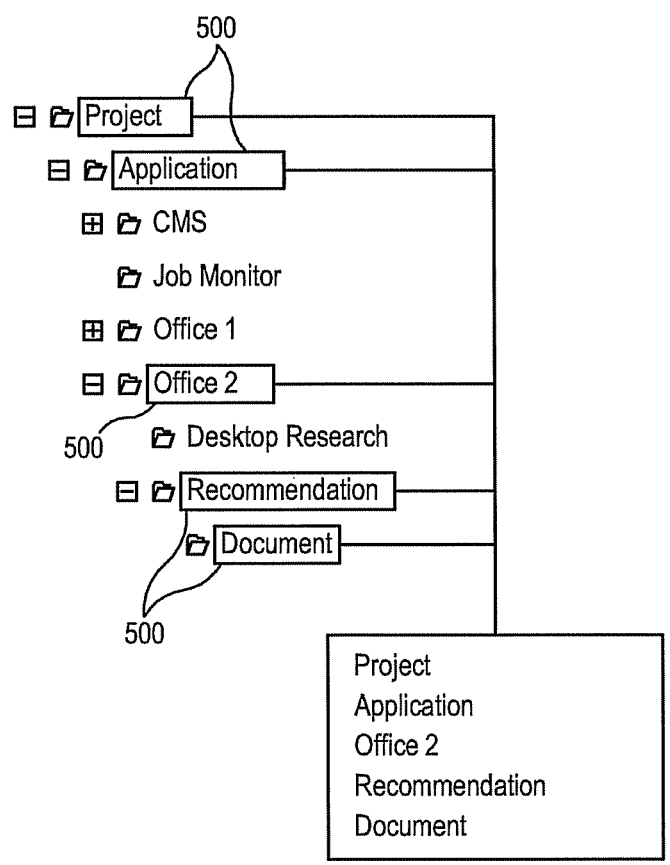
FIG. 5 illustrates a process of assigning a category to a document using the document management apparatus according to aspects of the present invention.

Hereinafter, a process of assigning categories to documents by using the document management apparatuses 100 and 200 according to aspects of the present invention will be described with reference to FIGS. 2 and 5. As shown by way of example in FIG. 5, the controller 30 controls the category generating unit 20 to set each sub-directory name 500 as a category with respect to documents stored in locations corresponding to directories named "Project," "Application," "Office2," "Recommendation" and "Document." Thus, aspects of the present invention assign a category or categories to a document without difficulty.

Figure 6A:
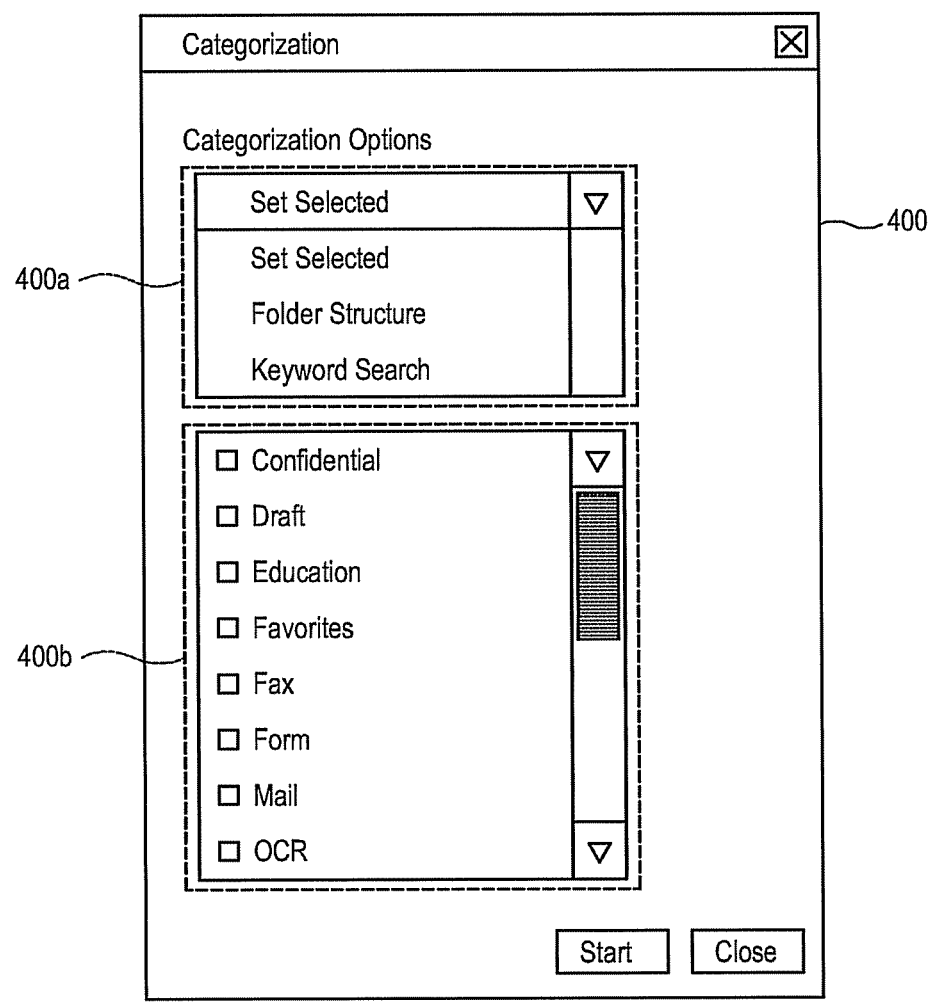
FIGS. 6A to 6C illustrate examples of assigning a category to a document using the document management apparatus according to aspects of the present invention.
Figure 6B:
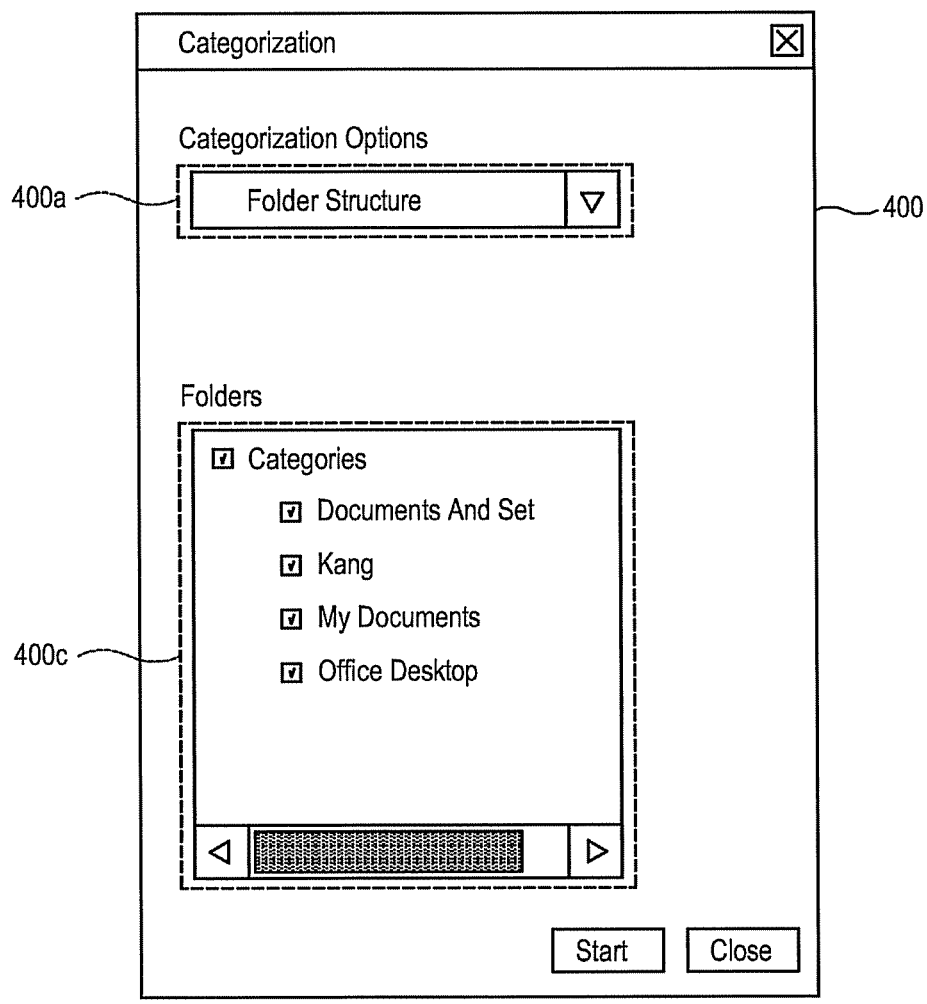
Figure 6C:
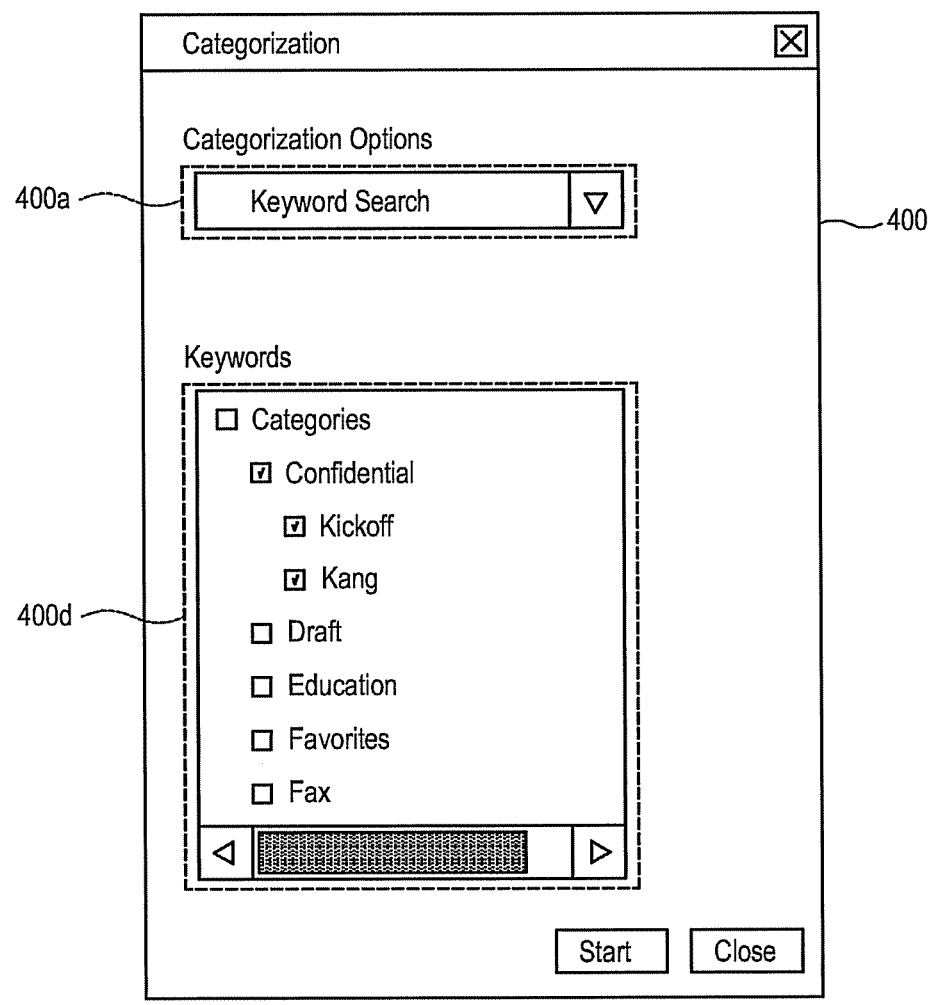

FIGS. 6A to 6C illustrate various examples of assigning a category to a document stored in the storage unit 10 by using the document management apparatuses 100 and 200 according to aspects of the present invention. FIG. 6A illustrates a categorization window 400 including a categorization options menu 400a having a variety of options to set categories, and a preset category list 400b to assign a desired preset category to a document according to a user's input. Using the categorization window 400, a user may adjust the name of the preset category, add a new category or remove an existing category.

FIG. 6B illustrates a categorization process in which each sub-directory name is set as a category with respect to a directory storing the documents. According to an aspect of the present invention, the term "sub-directory" refers to each separate name in a directory name, such as "Document and Settings," and the term "directory" refers to the overall group of sub-names used to identify the location of the document, such as "C:\Document and Settings\Kang\My Documents\office Desktop." For example, if a selected document is located at "C:\Document and Settings\Kang\My Documents\office Desktop," the user selects the categorization option "Folder Structure" from the categorization options menu 400a. The folder structure 400c displays each of the sub-directories for the selected document. Then, the controller 30 controls the category generating unit 20 to generate "Document and Settings," "Kang," "My Documents" and "Office Desktop" categories. Since a sub-directory name such as "Document and Settings" is not useful as a category, a user may remove the "Document and Settings" category from the generated categories.

FIG. 6C illustrates a process of assigning a preset category to a document if a search keyword is included in the document. As shown in FIG. 6C, if a user selects a particular search keyword, e.g., "Kickoff" or "Kang," the controller 30 displays the keywords in a keyword screen 400d and assigns a preset category, such as the "Confidential" category, to the document including the search keyword. Thus, a user may easily assign the desired category without searching for each document. Alternatively, the controller 30 may set the keyword itself as a category, or may set both the preset category and the keyword as categories.

Figure 7:
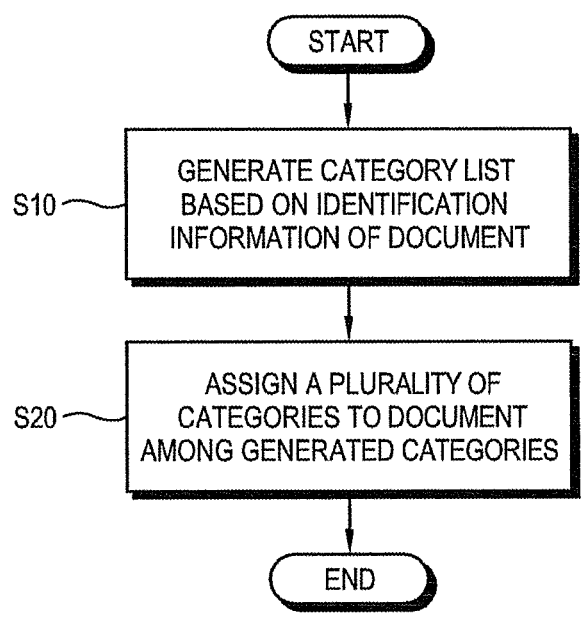
FIG. 7 is a flowchart illustrating document management method according to an embodiment of the present invention.

Hereinafter, a document management method according to an embodiment of the present invention will be described with reference to FIG. 7. The controller 30 controls the category generating unit 20 to generate a category list based on identification information of the document at operation S10). At operation S10, if the category of the category list includes a directory name or a sub-directory name, the directory name and/or sub-directory name may be removed according to preset removal conditions. For example, if the directory name or sub-directory name exceeds a preset size, or is a sub-directory name for an operating system, the directory name or the sub-directory name may be removed.

The controller 30 assigns at least one of the categories included in the category list generated at operation S10 to the document at operation S20.

The document management method according to aspects of the present invention may further include an operation of assigning a preset category to a document having a keyword. According to an aspect of the present invention, the preset category may be irrelevant to the keyword. Then, a user may assign a desired category without searching for each document.

The document management method according to aspects of the present invention may further include an operation of assigning at least one category selected from among a preset category list to the document according to a user's selection.

According to an aspect of the present invention, the categories shown in the preset category list may be edited. Thus, a user may edit the name of the preset category, add a new category, or remove an existing category.

Figure 8:
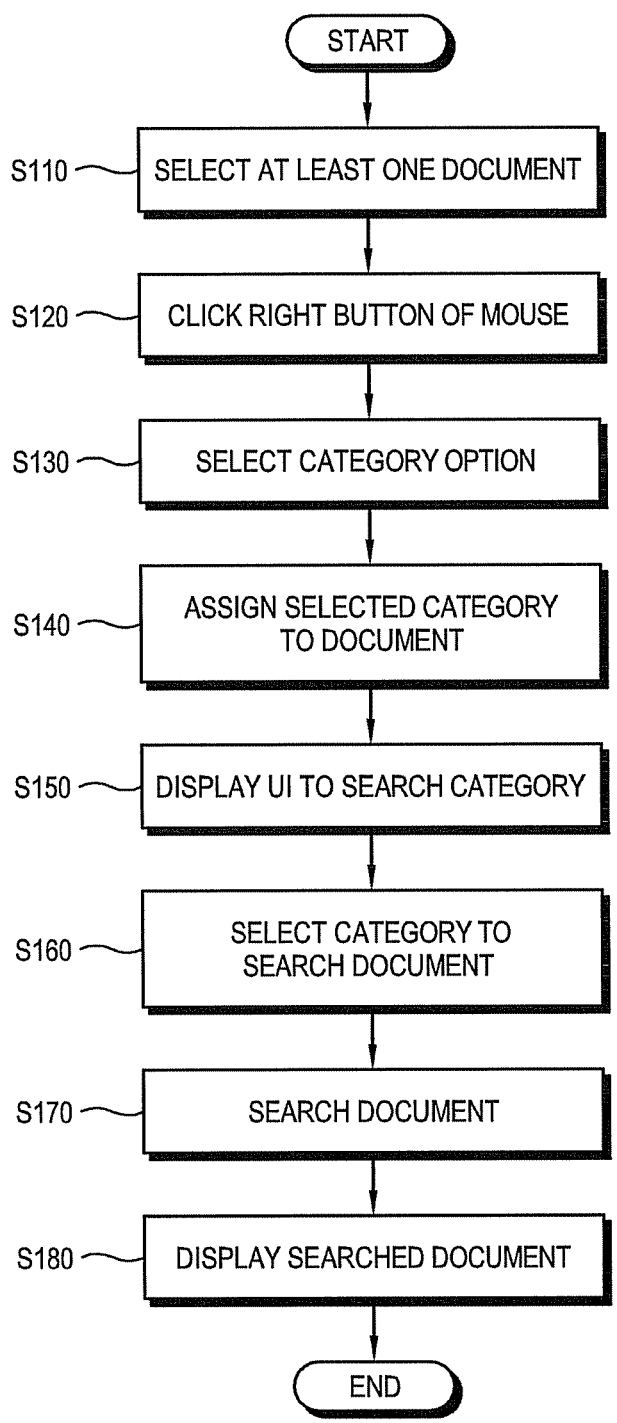
FIG. 8 is a flowchart illustrating a document management method according to another embodiment of the present invention.

FIG. 8 is a flowchart to describe a document management method according to another embodiment of the present invention. A user selects at least one document at operation S110), clicks a right button of a mouse while selecting the document at operation S120, and selects a category option at operation S130. Here, the category options include assigning at least one category to the document from among preset categories, assigning a category according to a corresponding directory name of the document, and setting a keyword of the document as the category. It is understood that the operation of clicking the "right button" of the mouse shown at operation S120 in FIG. 8 is exemplary only, and is not actually limited to clicking on the "right button" of the mouse, but may instead refer to various well-known processes used to generate an options menu on the UI 300, such as for example, pressing keys on a keyboard.

After the category option is selected at operation S130, the controller 30 assigns the selected category to the document at operation S140. After the category is assigned, a user can easily search for a document by searching for the assigned category. To search for a document, the controller 30 displays the UI 300 (FIG. 3) to search for the document by category at operation S150.

Then, a user selects a category to search for at operation S160. The controller 30 searches for the document through multiple levels of directories according to the selected category at operation S170. Then, the controller 30 displays the searched documents, i.e., the documents found by the searching, at operation S180.

As described above, an aspect of the present invention provide a document management method which automatically generates a category list including categories corresponding to the name of each sub-directory used to locate a document and assigns categories to the documents based on the sub-directory names to easily search for the document through multiple levels of directories, and a document management apparatus using the same.

Also, another aspect of the present invention provides a document management method which excludes a less relevant category among preset categories to more efficiently assign categories to documents, and a document management apparatus using the same.

Further, another aspect of the present invention provides a document management method which assigns a particular category to a document having a search keyword to enable a user to search for a desired document without difficulty, and a document management apparatus using the same.

Various components of the above described document management method and a document management apparatus using the same, such as the storage unit 10, category generating unit 20, and controller 30, can be integrated into a single control unit, or alternatively, can be implemented in software or hardware, such as, for example, an application specific integrated circuit (ASIC). As such, it is intended that the processes described herein be broadly interpreted as being equivalently performed by software, hardware, or a combination thereof. Such software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. The computer readable recording medium can also be distributed over network coupled computer systems so that the computer readable code is stored and executed in a distributed fashion. Also, functional programs, codes, and code segments for accomplishing aspects of the present invention can be easily construed by programmers skilled in the art to which aspects of the present invention pertain.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions, and sub-combinations may be made to adapt the teachings of aspects of the present invention to a particular situation without departing from the scope thereof. Alternative embodiments of the invention can be implemented as a computer program product for use with a computer system. Such a computer program product can be, for example, a series of computer instructions stored on a tangible data recording medium, such as a diskette, CD-ROM, ROM, or fixed disk. The series of computer instructions can constitute all or part of the functionality described above, and can also be stored in any memory device, volatile or non-volatile, such as semiconductor, magnetic, optical or other memory device.

What is claimed is:

1. An indexing method for a document, the method comprising:
 receiving, from a user, a selection of a document and an action to generate a category options menu for the selected document;
 automatically generating and displaying, in the category options menu, a category list including a directory name and a plurality of sub-directory names of a directory corresponding to at least one of a predetermined directory, a directory indicating where the document is stored according to a folder structure, and a keyword of the document, the category list corresponding to multiple levels of directories;

receiving, from the user, a selection of at least one category in the category list, each of the directory name and the sub-directory names corresponding to a plurality of categories in the category list;

removing at least one of the sub-directory names from the category list; and automatically assigning the selected category to the document, and categorizing the document based on the assigned category, wherein a name of the category in the category list may be adjusted by the user, and the category options menu displays options to set categories by the folder structure and keyword search.

2. The method according to claim 1, wherein the removing at least one of the sub-directory names from the category list comprises removing the at least one of the sub-directory names if a sub-directory name exceeds a preset size or corresponds to a sub-directory name for an operating system.

3. The method according to claim 1, wherein the action corresponds to clicking a right button of a mouse while selecting the document.

4. The method according to claim 1, wherein the predetermined category selected from among the preset category list is editable or addable.

5. The method according to claim 1, further comprising generating the category list based on identification information of the document.

6. The method according to claim 1, further comprising searching for the document using the assigned category.

7. A document management apparatus, comprising:
a storage unit which stores a document therein;
a display unit which displays a category list including a directory name and a plurality of sub-directory names of a directory corresponding to at least one of a predetermined directory, a directory indicating where the document is stored according to a folder structure, and a keyword of the document, the category list corresponding to multiple levels of directories;
an input unit which receives a user selection of a document, an action to generate a category options menu for the selected document, and a user selection of at least one category in the category list, each of the directory name and the sub-directory names corresponding to a plurality of categories in the category list; and
a hardware controller which automatically generates the category list upon the receiving the action, controls the display unit to display the category list, assigns the selected category to the document, and categorizes the document based on the assigned category,
wherein a name of the category in the category list may be adjusted by the user, and
wherein the hardware controller removes at least one of the sub-directory names from the category list, and
the category options menu displays options to set categories by the folder structure and keyword search.

8. The document management apparatus according to claim 7, wherein the hardware controller removes the at least one of the sub-directory names if a sub-directory name exceeds a preset size or corresponds to a sub-directory name for an operating system.

9. The document management apparatus according to claim 7, wherein the action corresponds to clicking a right button of a mouse while selecting the document.

10. The document management apparatus according to claim 7, wherein the hardware controller edits or adds the predetermined category.

11. The document management apparatus according to claim 7, further comprising:
a category generating unit which generates the category list based on identification information of a document.

12. The document management apparatus according to claim 7, wherein the hardware controller searches for the document using the assigned category.

13. The document management apparatus according to claim 7, further comprising:
a user interface generator to generate a user interface comprising a category adding region which displays the category list on the display unit.

14. A method to search for documents, comprising:
receiving a category selection in a user interface to search for a categorized document;
searching through multiple levels of directories for the document according to the category selection; and
displaying the document according to whether the category selection corresponds to a directory used to locate the document which has been assigned to the document as the category,
wherein the assigned category is included in an automatically generated category list including a directory name and a plurality of sub-directory names of a directory corresponding to at least one of a predetermined directory, a directory indicating where the document is stored according to a folder structure, and a keyword of the document, and the assigned category corresponds to at least one category in the category list, each of the directory name and the sub-directory names corresponding to a plurality of categories in the category list, the category list being automatically generated and displayed upon receiving an action from a user to generate a category options menu for a document, and
wherein a name of the category in the category list may be adjusted by the user, and
wherein the searching comprises excluding a search of another category which has been removed according to preset removal conditions, and
the category options menu displays options to set categories by the folder structure and keyword search.

15. The method according to claim 14, wherein the preset removal conditions comprise at least one whether the another category corresponds to a sub-directory name exceeding a preset size or whether the another category corresponds to a sub-directory name for an operating system.

16. The document management method of claim 14, wherein the displaying of the document comprises displaying a thumbnail of the document on the user interface.

* * * * *